(12) United States Patent
Kim et al.

(10) Patent No.: US 10,771,227 B2
(45) Date of Patent: Sep. 8, 2020

(54) USER EQUIPMENT AND METHOD FOR MANAGING BACKOFF TIME IN THE USER EQUIPMENT

(75) Inventors: Sang Bum Kim, Suwon-si (KR); Kyeong In Jeong, Suwon-si (KR); Soeng Hun Kim, Yongin-si (KR); Jae Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/115,740

(22) PCT Filed: May 7, 2012

(86) PCT No.: PCT/KR2012/003547
§ 371 (c)(1),
(2), (4) Date: Nov. 5, 2013

(87) PCT Pub. No.: WO2012/153951
PCT Pub. Date: Nov. 15, 2012

(65) Prior Publication Data
US 2014/0079013 A1 Mar. 20, 2014

(30) Foreign Application Priority Data

May 6, 2011 (KR) .................. 10-2011-0042983
Aug. 12, 2011 (KR) .................. 10-2011-0080710

(51) Int. Cl.
*H04L 5/00* (2006.01)
*H04W 28/02* (2009.01)
*H04W 74/08* (2009.01)

(52) U.S. Cl.
CPC ....... *H04L 5/0085* (2013.01); *H04W 28/0215* (2013.01); *H04W 74/0833* (2013.01)

(58) Field of Classification Search
None
See application file for complete search history.

(56) References Cited

U.S. PATENT DOCUMENTS

2004/0146019 A1 7/2004 Kim et al.
2009/0201798 A1* 8/2009 Lee .................. H04W 74/002
370/216

(Continued)

FOREIGN PATENT DOCUMENTS

EP 2 173 133 A1 4/2010
JP 2010-288302 A 12/2010

(Continued)

OTHER PUBLICATIONS

LG Electronics Inc., Random Access Overload Control for MTC, 3GPP Draft; R2-112372 RA Overload Control for MTC_R0, 3rd Generation Partnership Project (3GPP), Apr. 5, 2011, vol. RAN WG2, No. Shanghai, China, Sophia-Antipols Cedex, France.

(Continued)

*Primary Examiner* — Ruihua Zhang
(74) *Attorney, Agent, or Firm* — Jefferson IP Law, LLP (57) ABSTRACT

The present invention relates to a method for efficiently controlling an MTC device attempting a delay tolerant access in a 3GPP system. The present invention provides a method for effectively providing a backoff time to prevent load on a wireless network, which can occur when many MTC devices in a single cell simultaneously attempt access.

12 Claims, 7 Drawing Sheets

(56) References Cited

U.S. PATENT DOCUMENTS

| | | | |
|---|---|---|---|
| 2010/0105380 A1* | 4/2010 | Attar | H04W 48/16 455/434 |
| 2010/0202288 A1* | 8/2010 | Park et al. | 370/230 |
| 2010/0240377 A1* | 9/2010 | De Pasquale | H04W 28/16 455/445 |
| 2010/0296467 A1* | 11/2010 | Pelletier et al. | 370/329 |
| 2011/0274040 A1* | 11/2011 | Pani | H04W 4/005 370/328 |
| 2012/0033613 A1* | 2/2012 | Lin | H04W 74/085 370/328 |
| 2012/0039171 A1* | 2/2012 | Yamada et al. | 370/232 |
| 2012/0178457 A1* | 7/2012 | Liao | H04W 76/18 455/437 |
| 2012/0218889 A1* | 8/2012 | Watfa | H04W 60/04 370/230 |
| 2013/0035064 A1* | 2/2013 | Balachandran | H04W 48/02 455/411 |
| 2013/0040605 A1* | 2/2013 | Zhang | H04W 48/06 455/411 |
| 2013/0170479 A1* | 7/2013 | Fong | H04W 74/085 370/336 |
| 2014/0128029 A1* | 5/2014 | Fong | H04W 48/12 455/411 |

FOREIGN PATENT DOCUMENTS

| | | |
|---|---|---|
| KR | 10-2006-0014012 A | 2/2006 |
| KR | 10-2009-0050155 A | 5/2009 |
| KR | 10-2009-0099555 A | 9/2009 |
| KR | 10-0949972 B1 | 3/2010 |
| WO | 2009/096731 A2 | 8/2009 |
| WO | 2012-020849 A1 | 2/2012 |

OTHER PUBLICATIONS

Intel Corporation: "Additional requirements on EAB for RAN overload protection", 3GPP Draft; S1-111152_MTC_EAB_R1, rd Generation Partnership Project (3GPP), Mobile Competence Centre; 650 Route Des Lucioles; F-06921 Sophia-Antipolis Cedex; France, vol. SA WG1, no Xian; May 9, 2011, May 2, 2011 (May 2, 2011), XP050514825, [retrieved on May 2, 2011].

China Mobile et al., Backoff for UEs of different priorities, 3GPP TSG-RAN WG2#61, R2-080750, Feb. 5, 2008, XP050138577, Sorrento, Italy.

Alcatel-Lucent et al: "Merits of the Slotted Access with EAB for MTC", 3GPP Draft; R2-113182_MTC_Slottedaccess+EAB, 3rd Generation Partnership Project (3GPP), Mobile Competence Centre ; May 3, 2011; 650, Route Des Lucioles ; F-06921 Sophia-Anti Polis Cedex; France, vol. RAN WG2, No. Barcelona, Spain; XP050495354;.

European Search Report dated Apr. 8, 2019; Reference: P6048749EP1; Application #Patent #: 18213667.1-1215.

* cited by examiner

USER EQUIPMENT AND METHOD FOR MANAGING BACKOFF TIME IN THE USER EQUIPMENT

TECHNICAL FIELD

The present invention relates to a method for controlling an MTC device attempting delay tolerant access efficiently in a 3GPP system. Particularly, the present invention proposes a method for configuring the backoff time efficiently to reduce the load of a radio access node in a situation that a plurality of MTC devices are attempting access simultaneously within a cell.

BACKGROUND ART

The mobile communication system has been developed for the user to communicate on the move. With the rapid advance of technologies, the mobile communication system has evolved to the level capable of providing high speed data communication service as well as voice telephony service. Recently, the next generation mobile communication system moves its focus to Human to Machine (H2M) and Machine to Machine (M2M) communication beyond Human to Human (H2H) communication. In order to meet such a requirement, the $3^{Rd}$ Generation Partnership Project (3GPP) communication standard organization is standardizing on Machine Type Communications (MTC).

MTC has characteristics different from those of the conventional radio communication. The MTC characteristics are classified variously depending on the usage purpose. For example, the MTC devices requiring communication a few times a day without periodicity have delay tolerant characteristic. In contrast, the MTC device fixed at a location to collect and transfer predetermined information has the characteristic of low mobility. The mobile network operator has to provide services in consideration of the coexistence of the MTC devices having various characteristics and legacy terminals.

Typically, a plurality of MTC devices exists within a cell. If the MTC devices attempt access simultaneously, the load of the access network may increase abruptly. This makes the network unstable and, as a consequence, most of the terminals are likely to fail initial access. Since the most MTC devices have the delay tolerant characteristic, it is not necessary to establish connection to the base station immediately.

DISCLOSURE OF INVENTION

Technical Problem

In the case that the load of the radio access network is greater than a predetermined threshold value, the base station restricts the initial access of MTC devices to control the access network load. The initial access-restricted MTC device retries network access after a predetermined time, which is referred to as backoff time. In order to control the radio access network load, the 3GPP is studying a method of applying the extended random access technique. In the legacy random access technique, a backoff time may be applied after the terminal has transmitted a Random Access Preamble for initial access. Accordingly, there is a need of extension in order to back off the initial access itself.

Solution to Problem

In accordance with an aspect of the present invention, a backoff time management method of a terminal includes determining whether a system information block received from a base station includes a backoff indicator, calculating, when the backoff indicator is included, the backoff time using backoff indicator information, delaying preamble transmission time for initial random access as much as the calculated backoff time, and transmitting the preamble when the backoff time expires.

In accordance with another aspect of the present invention, a backoff time management terminal includes a transceiver which receives a system information block from a base station and a controller which determines whether a system information block received from a base station includes a backoff indicator, calculates, when the backoff indicator is included, the backoff time using backoff indicator information, delays preamble transmission time for initial random access as much as the calculated backoff time, and transmits the preamble when the backoff time expires.

Advantageous Effects of Invention

According to the present invention, if the access network load increases, the terminal as the MTC device backs off the initial access attempt to reduce the access network load of the base station. If necessary, the base station also may restrict the access of the MTC devices and apply backoff time to the MTC device restrictively.

BRIEF DESCRIPTION OF DRAWINGS

FIG. 7 is a diagram illustrating a BI subheader. That is, FIG. 7 is a diagram illustrating the BI sub-header used in LTE standard.

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc.

Therefore, the definition should be made on the basis of the overall content of the present specification.

The present invention relates to a method for controlling MTC device attempting delay tolerant access efficiently in the 3GPP system. The present invention also proposes a method for configuring backoff time to reduce the access network load occurring in a situation where a plurality of MTC devices attempt access simultaneously within a cell.

Figure 1:
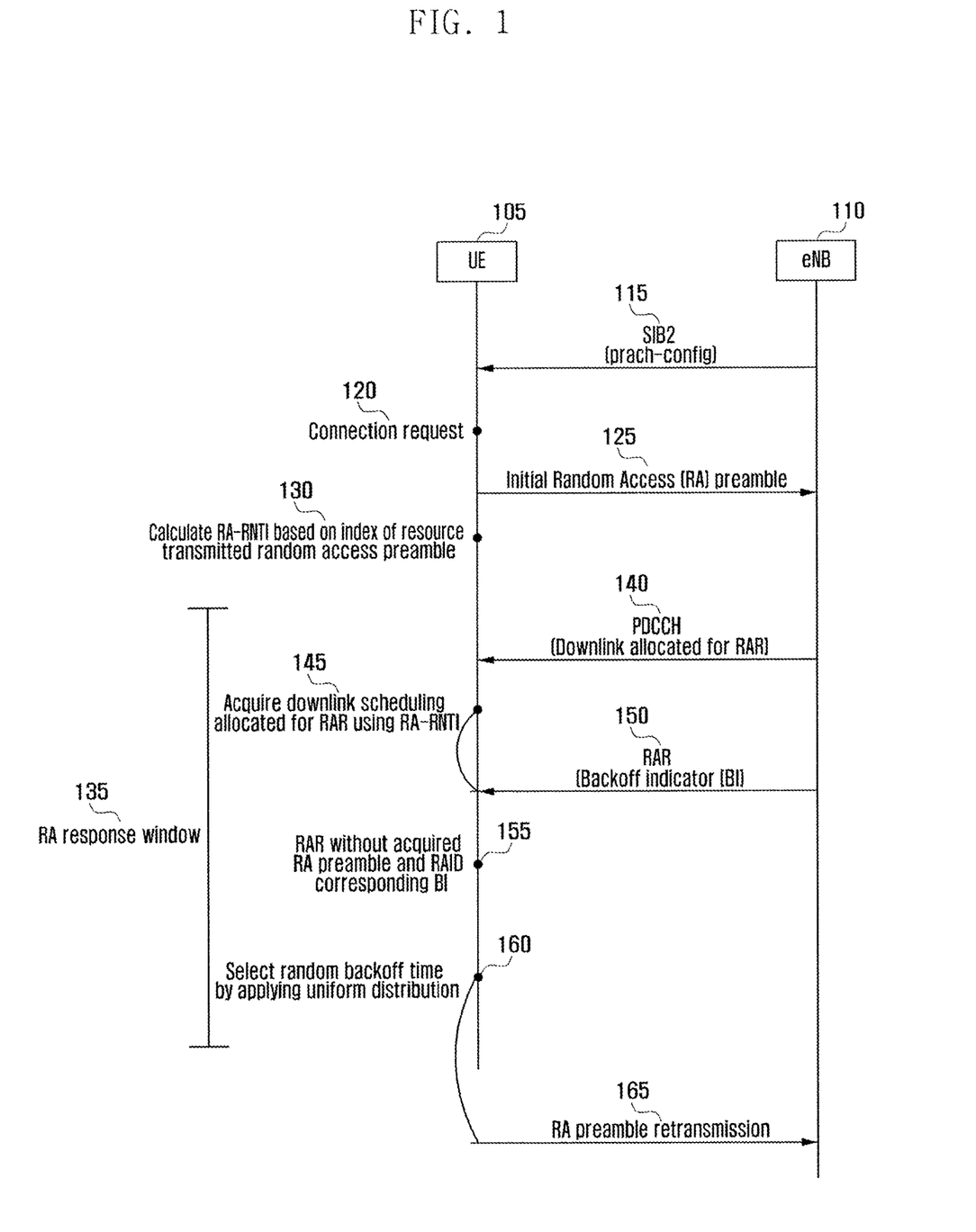
FIG. 1 is a diagram illustrating backoff time application in a random access procedure according to an embodiment of the present invention.

FIG. 1 is a diagram illustrating backoff time application in a random access procedure according to an embodiment of the present invention.

Referring to FIG. 1, the terminal 105 receives information necessary for performing the random access, i.e. Physical Random Access Channel configuration (prach-config.) in System Information Block (SIB) 2 at step 115. This information includes preamble selection criteria, RA Response window size, and preamble transmit power information. If it is necessary to establish a connection, the terminal 105 sends an evolved Node B (eNB) 110 an initial random access (RA) preamble at step 125.

Next, the terminal 105 calculates Random Access-Radio Network Temporary Identifier (RA-RNTI) based on the time and frequency position information on the resource used for transmitting initial RA preamble at step 130. The RA-RNTI is used to identify the scheduling information of Random Access Responding (RAR) transmitted to the User Equipment (UE) 105 on Physical Downlink Control Channel (PDCCH).

The UE 105 decodes PDCCH using the calculated RA-RNTI at operation 140. The UE 105 acquires the RAR scheduling information from the decoded PDCCH at step 145. The terminal 105 receives the RAR using the acquired RAR scheduling information at step 150.

The RAR includes a Backoff Indicator (BI). The RAR reception is attempted in a predetermined time duration referred to as RA response window 135. This no RAR is received in the time duration, the UE 105 determines that the corresponding random access has failed. Although the RAR is received, if the RAR has no Random Access Preamble Identifier (RAPID) of the preamble transmitted by the corresponding UE, the UE 105 determines that the random access has failed at step 155. The UE 105 stores the received BI.

If the random access has failed, the UE 105 selects a value in the range from 0 to the indication value of the BI randomly to perform backoff at step 160. Afterward, the UE 105 retries random access at operation 165. As shown in FIG. 1, the backoff time may be applied for only the retry since the initial random access. However, if radio access network overload occurs, the initial random access has to be restricted. There is therefore a need of a random access procedure supporting such a situation. This procedure is not applied to all the UEs but MTC devices performing the delay tolerant access.

Embodiment 1

Embodiment 1 relates to a method for calculating the backoff time by applying common RA-RNTI and RAR for MTC devices separately.

When transmitting the initial preamble in the random access procedure, the RA-RNTI for receiving RAR is calculated. The backoff time is received using the BI included in the RAR. In order to acquire the BI without initial preamble transmission in the random access procedure, a common RA-RNTI for MTC devices is defined in advance in embodiment 1. Accordingly, the UE is capable of acquiring RA-RNTI without transmission of the initial preamble. This method is advantageous in that, if necessary, the eNB may apply a separate backoff time as well as restrict the access attempts of only the MTC devices.

Figure 2:
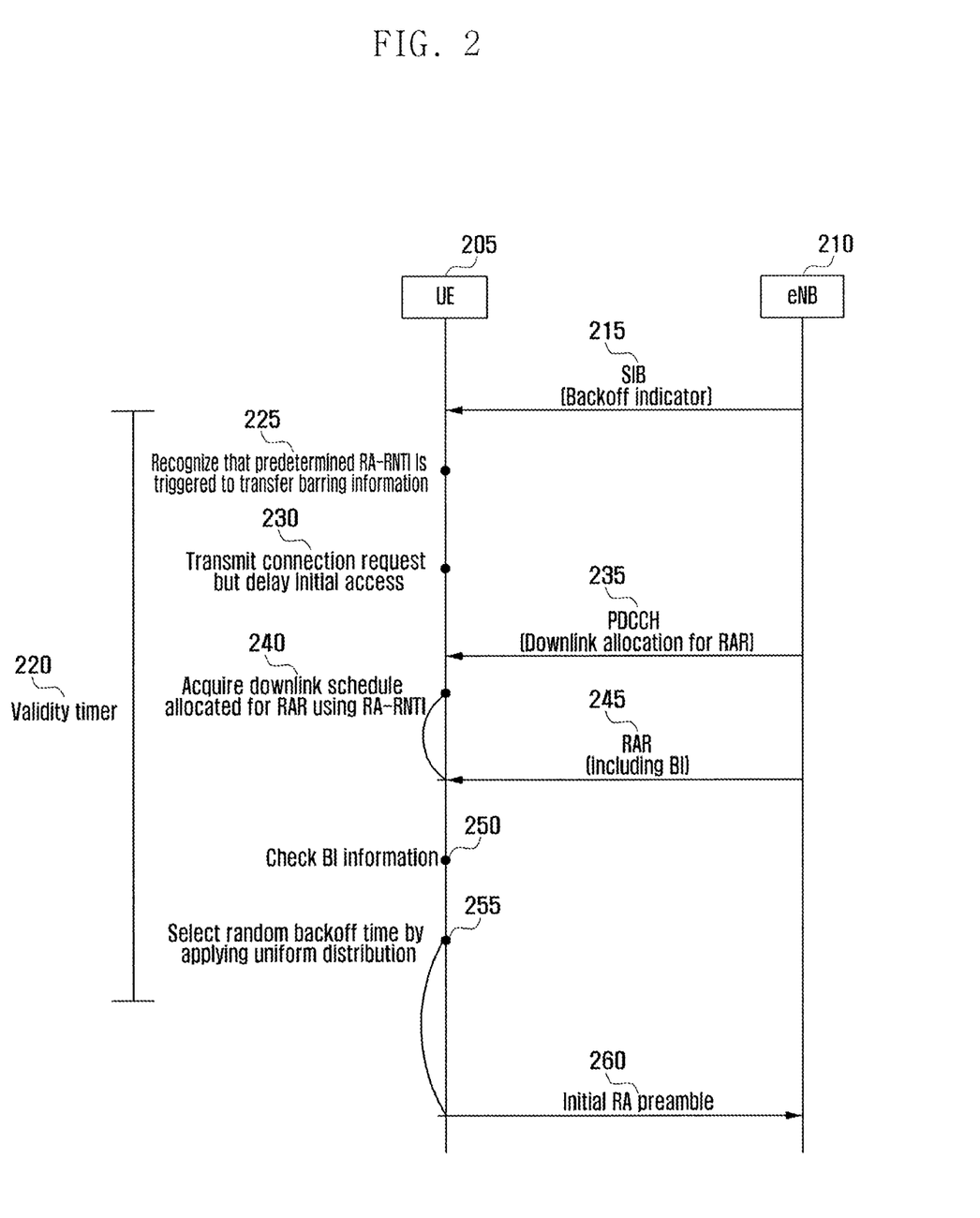
FIG. 2 is a diagram illustrating signal flows between UE and eNB in a mobile communication system according to the first embodiment of the present invention.

FIG. 2 is a diagram illustrating signal flows between UE and eNB in a mobile communication system according to the first embodiment of the present invention.

Referring to FIG. 2, if it is determined to restrict the access of the MTC devices due to the increase of radio access network load, the eNB 210 sends the UE as an MTC device the Backoff Indicator (BI) in the SIB at step 215. The newly defined backoff indicator may be received by all of the UEs within the cell as information broadcast in the SIB. Here, the backoff indicator is the information added to delay the backoff time. Accordingly, if the backoff indicator is included in the SIB, this means that the eNB does not want the MTC devices to attempt access. The backoff indicator has a validity timer and thus, if the validity timer 220 expires, the backoff indicator loses validity. Accordingly, although an indicator is received, if the validity timer 220 expires, the legacy random access is applied.

If the backoff indicator is found in the SIB, the UE 205 recognizes that a predetermined RA-RNTI is used for transmitting the barring information at step 225. Then, although access is required, the UE 205 delays the initial access attempt at step 230. The UE 205 receives PDCCH using a predetermined RA-RNTI for checking the common MTC device RAR scheduling information at step 235. The RA-RNTI is the identifier used for acquiring scheduling information on the message destined to UE on the PDCCH.

The UE 205 acquires the RAR scheduling information on the PDCCH at step 240. Then UE 205 receives RAR using the acquired RAR scheduling information at operation 245. The common MTC device RAR also includes the BI like the legacy RAR. The UE 205 checks the BI at step 250. The terminal 205 calculates the backoff time using the BI at step 255. If the calculated backoff time elapses, the UE 205 transmits the initial RA preamble at step 260. Through this procedure, the UE delays the preamble transmission for initial access as long as intended by the eNB.

Figure 3:
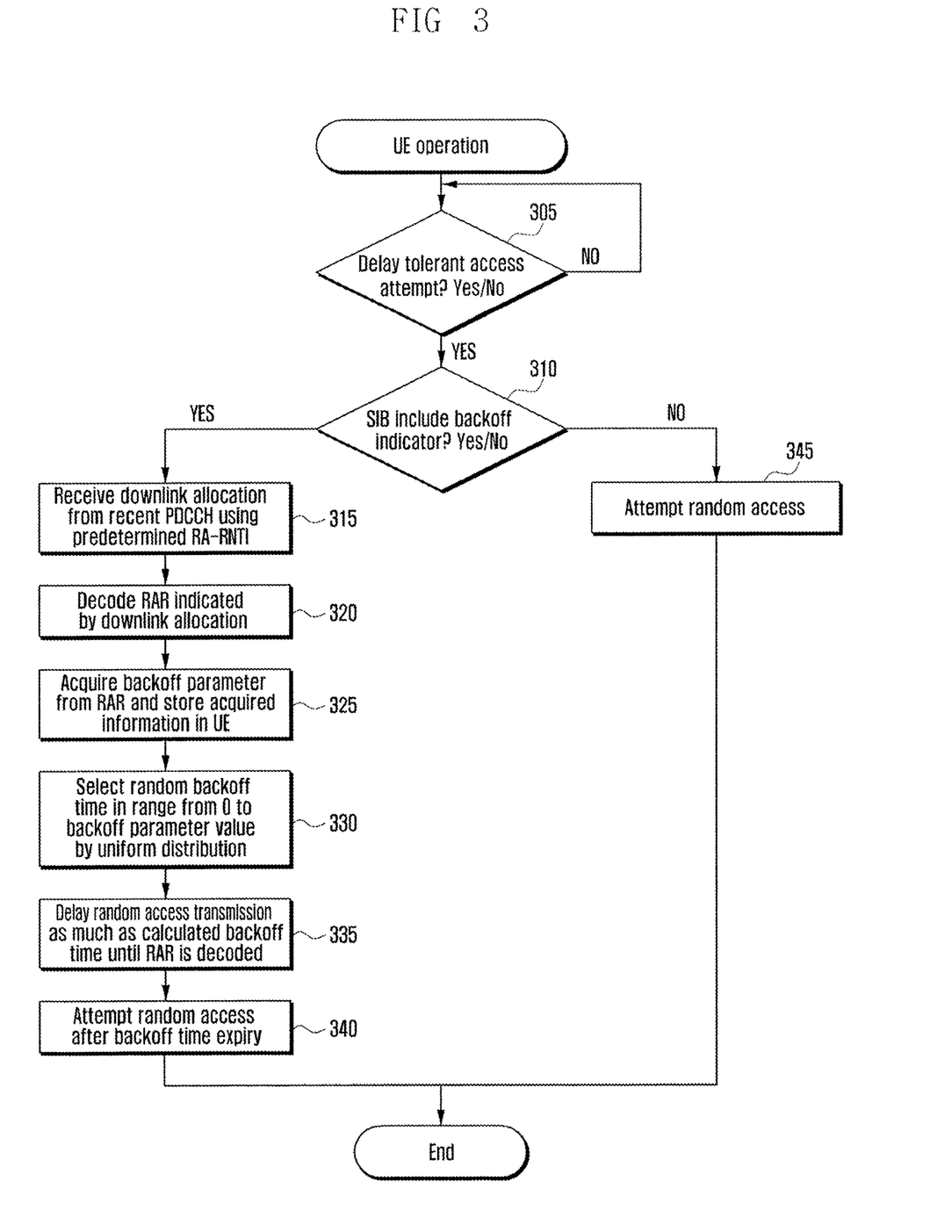
FIG. 3 is a flowchart illustrating a UE operation procedure according to the first embodiment of the present invention.

FIG. 3 is a flowchart illustrating a UE operation procedure according to the first embodiment of the present invention.

Referring to FIG. 3, the UE determines whether to perform a delay tolerant access for adjusting the access attempt time at step 305. If the delay tolerant access required, the UE is an MTC device. The UE decodes the SIB received from the eNB and determines whether the SIB includes a backoff indicator at operation 310. The backoff indicator indicates the existence of barring information for delay tolerant access.

If the SIB includes the backoff indicator, the UE acquires RAR scheduling information from the recent PDCCH using a predetermined RA-RNTI at step 315. The UE receives the RAR using the scheduling information acquired from PDCCH at step 320. Next, the UE stores the BI acquired from the received RAR at step 325.

The UE calculates the backoff time using the BI information at step 330. The backoff time may be calculated as follows. The BI information may include at least one backoff parameter. Accordingly, the backoff time is determined as a random value selected in the range from 0 to the backoff parameter value. The UE delays the preamble transmission as long as the calculated backoff time at step 335. If the backoff time has elapsed, the UE transmits the preamble at step 340.

Returning to step 310, if the SIB includes no backoff indicator, the UE attempts random access at step 345.

Embodiment 2

FIG. 2 relates to a method for calculating the backoff time by applying, if necessary, predefined common MTC device BI information.

If it is determined to restrict access of the MTC devices due to the increase radio access network load, the eNB transmits a backoff indicator to the UEs. If the backoff indicator is received, the MTC devices calculate the backoff time using the predetermined BI information. This method makes it possible to restrict the access of the MTC devices simply without extra definition and procedure. Here, if the backoff indicator is received, the UE as an MTC device calculates the backoff time using the predetermined BI value. Also, the UE may calculate the backoff time using the predetermined BI included in the SIB broadcast by the eNB.

Figure 4:
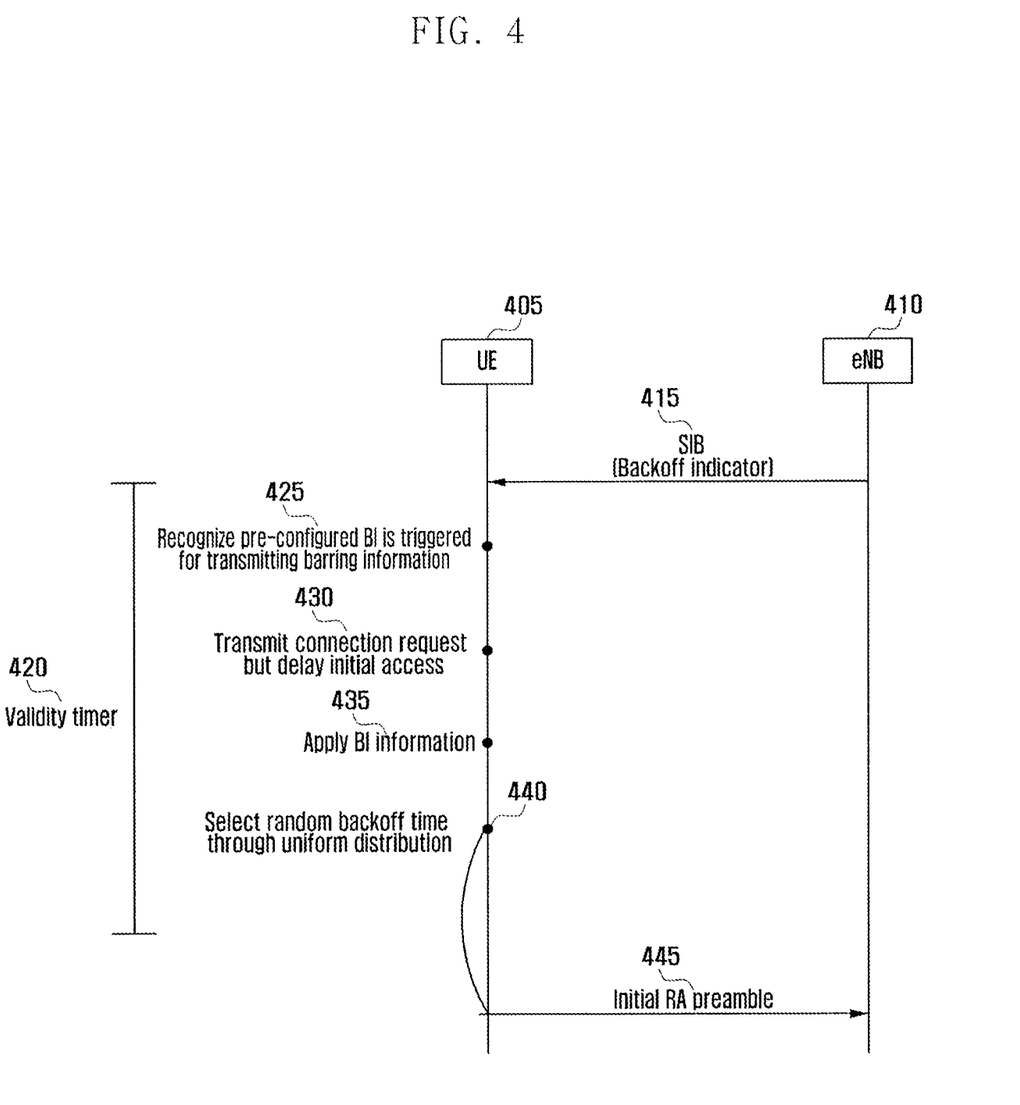
FIG. 4 is a diagram illustrating signal flows between UE and eNB in a mobile communication system according to the second embodiment of the present invention.

FIG. 4 is a diagram illustrating signal flows between UE and eNB in a mobile communication system according to the second embodiment of the present invention.

Referring to FIG. 4, if the radio access network load increases, the eNB 410 determines that it is necessary to restrict the access of MTC devices and transmits the backoff indicator in SIB to the UE 405 at step 415. The newly defined backoff indicator may be received by all of the UEs within the cell through an SIB. If the backoff indicator is included in the SIB, this means that the eNB 410 does not want the MTC devices to attempt access. The backoff indicator has a validity timer and thus, if the validity timer 420 expires, the backoff indicator loses validity. Accordingly, although an indicator is received at certain timing, if the validity timer 420 expires, the legacy random access is applied.

If the backoff indicator is acquired in the SIB, the UE 405 recognizes that it is necessary to trigger a predetermined BI information for the barring information at step 425. Although there is any connection request, the UE 405 delays the initial access attempt at step 430. Next, the UE 405 applies the predetermined BI information at step 435 and calculates the backoff time using the applied BI information at step 440. If the calculated backoff time has elapsed, the UE transmits the initial RA preamble at step 445. Through this procedure, the UE delays the preamble transmission for initial access as long as intended by the eNB.

Figure 5:
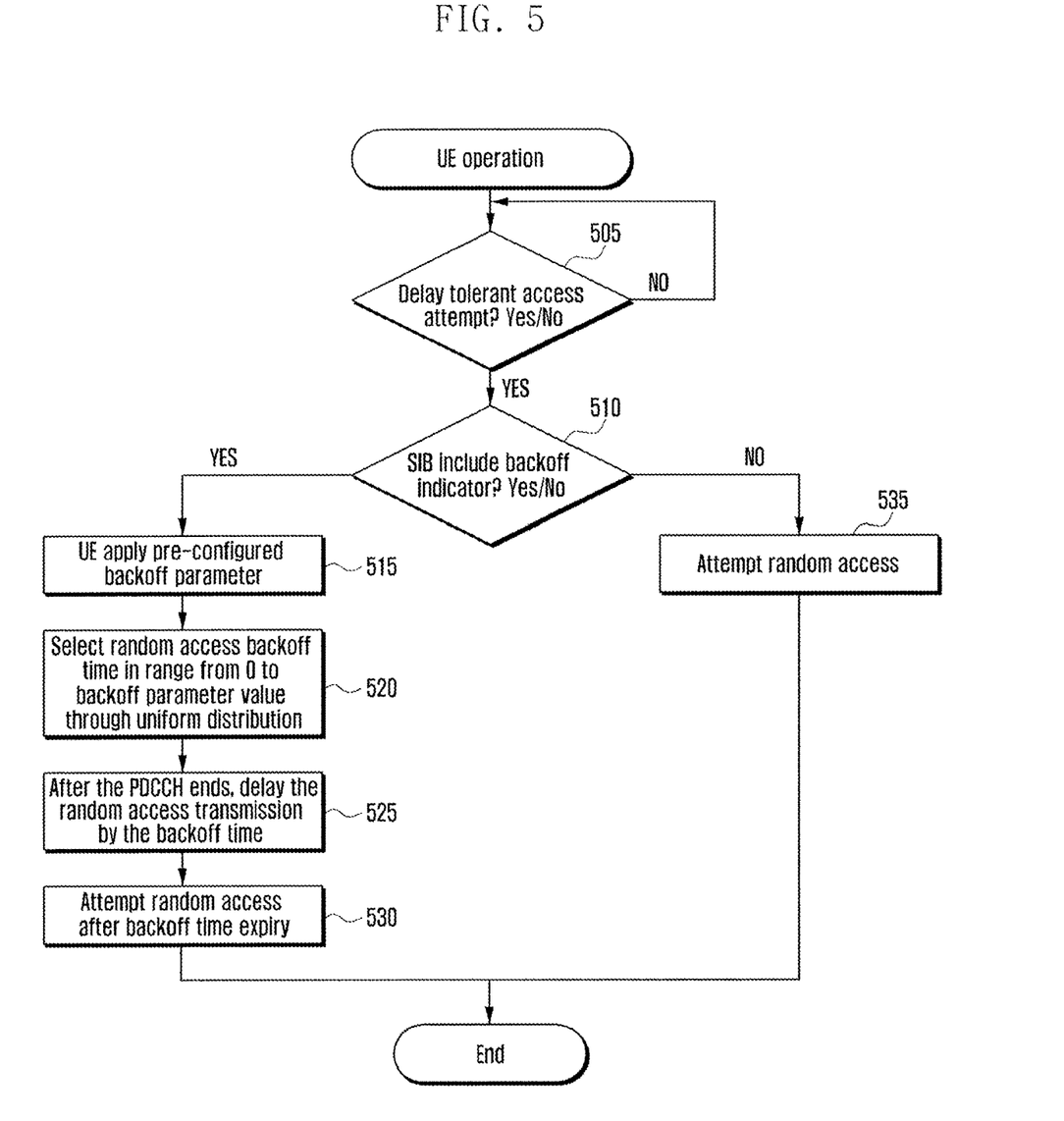
FIG. 5 is a flowchart illustrating a UE operation procedure according to the second embodiment of the present invention.

FIG. 5 is a flowchart illustrating a UE operation procedure according to the second embodiment of the present invention.

Referring to FIG. 5, the UE whether it is necessary to perform delay tolerant access at step 505. The UE which is required to perform the delay tolerant access is an MTC device. If it is necessary to perform delay tolerant access, the UE decodes the SIB received from the eNB and determines whether the SIB includes a backoff indicator at step 510. Here, the backoff indicator indicates whether there is any barring information associated with the delay tolerant access.

If the SIB includes the backoff indicator, the UE applies predetermined BI information at step 515. The UE calculates the backoff time using the BI information at step 520. The backoff time is calculated as follows. The BI information includes a backoff parameter. The backoff time is set to a value selected randomly in the range from 0 to the backoff parameter value.

The UE delays the preamble transmission as long as the calculated backoff time at step 525. If the backoff timer has elapsed, the UE transmits the preamble at step 530. Returning to step 510, if the SIB include no backoff indicator, the UE attempts the random access through the legacy procedure at step 535. That is, the UE transmits the initial access preamble to the eNB without delay as much as the backoff time.

Figure 6:
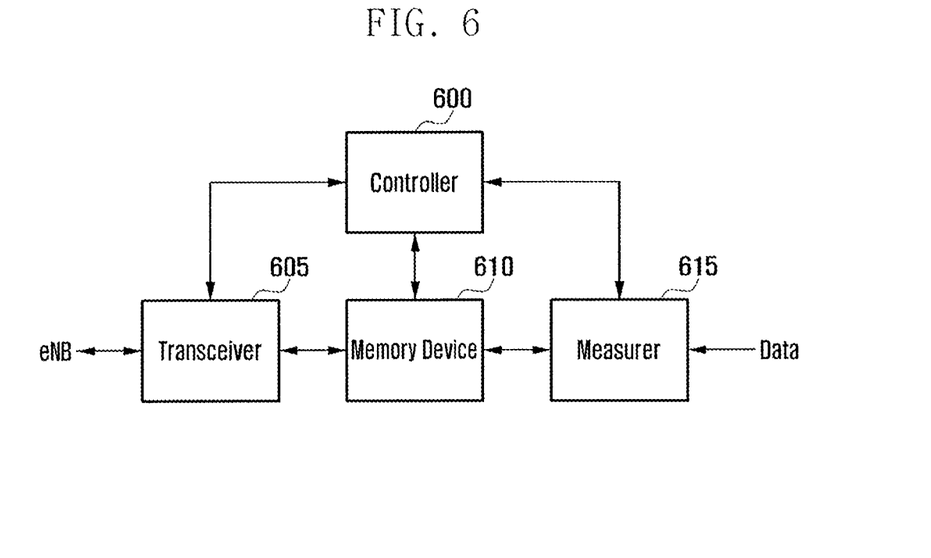
FIG. 6 is a block diagram illustrating a UE according to an embodiment of the present invention.

FIG. 6 is a block diagram illustrating a UE according to an embodiment of the present invention.

Referring to FIG. 6, the UE includes a controller 600, a transceiver 605, a memory device 610, and a measurer 615. The controller 600 controls the components constituting the UE. The controller 600 decodes and analyzes the received SIB, PDCCH, and RAR. The controller 600 sends the access information stored in the memory device 610 to the transceiver 605. Next, the controller 600 collects the data from the measurer 615 to be transmitted to the eNB and stores the collected information in the memory device 610.

The controller 600 determines whether the delay tolerant access attempt is necessary. If the delay tolerant access attempt is necessary, the controller 600 determines whether the SIB received from the eNB includes a backoff indicator.

If the SIB includes no backoff indicator, the controller 600 controls the transceiver to transmit a preamble for initial random access. The controller 600 also determined whether an RAR is received in response to the preamble. If an RAR is not received, the controller 600 calculates the backoff time based on the BI information and retries random access after the calculated backoff time.

If the SIB includes the backoff indicator, the controller 600 calculates the backoff time using the backoff parameter to determine the time for initial access attempt. At this time, the controller 600 acquires RAR scheduling information from the recent PDCCH and determines the backoff time based on the backoff parameter of the BI information included in the RAR scheduling information. The controller 600 may apply the predetermined BI information and determine the backoff time based on the backoff parameter included in the applied BI information.

Next, the controller 600 controls the transceiver to transmit the preamble for network access after the calculated backoff time.

Figure 7:
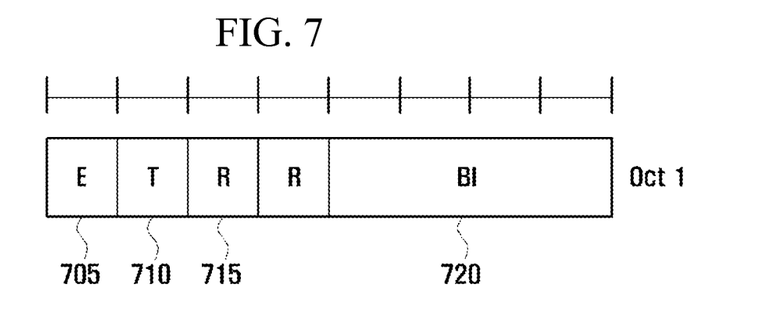

FIG. 7 is a diagram illustrating a BI subheader. That is, FIG. 7 is a diagram illustrating the BI sub-header used in LTE standard.

Referring to FIG. 7, the sub-header is used for transmitting BI information and includes E, T, R, and BI fields. The E field 705 indicates whether a sub-header or a MAC RAR is transmitted at the next. The T field 710 is the field to indicate whether the corresponding sub-header includes BI or Random Access Preamble Identifier (RAPID). The T field 710 is set to 0 for indication of inclusion of BI or 1 for indication of inclusion of RAPID in the sub-header. The R field 715 includes reserved bits, and the BI field 720 is the Backoff Indicator field.

The backoff time to be applied to the MTC device may have a value greater than that to be applied to the normal UE. Accordingly, there is a BI having a broad range as compared to the conventional BI value. For this purpose, the BI sub-header is modified in structure through the following procedure.

Figure 8:
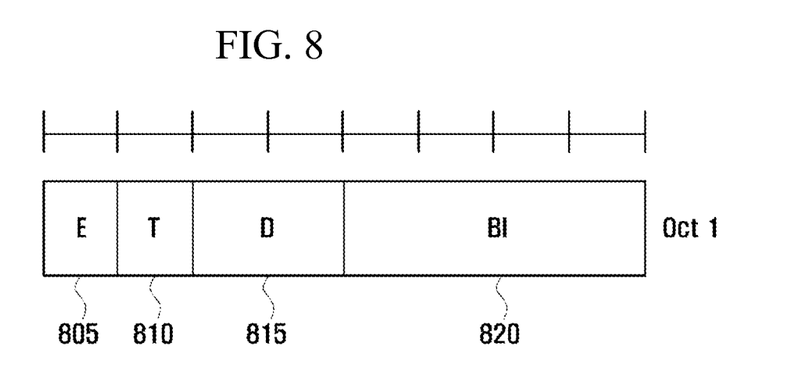
FIG. 8 is a diagram illustrating a range of the BI value according to the third embodiment of the present invention.

FIG. 8 is a diagram illustrating a range of the BI value according to the third embodiment of the present invention. In more detail, FIG. 8 sows the BI sub-header with the BI value range extended using the reserved bit as compared to the conventional BI sub-header.

Referring to FIG. 8, the BI sub-header with the extended BI value range includes E, T, D and BI fields.

The E field 805 indicates whether a sub-header or a MAC RAR follows at the next. The T field 810 is the field to indicate whether the corresponding sub-header includes BI or Random Access Preamble Identifier (RAPID). The T field 810 is set to 0 for indication of inclusion of BI or 1 for indication of inclusion of RAPID in the sub-header. The D field 815 includes $index_M$ value and is used to derive the BI value for MTC device. The BI field 820 is the Backoff Indicator field and compatible with the conventional BI value.

It is assumed that the BI value applied to the MTC device is defined as $BI_{MTC}$=BIX$index_M$. The $BI_{MTC}$ to be used for the MTC device is derived by multiplying $index_M$ indicated by the D field 815 to the BI applied to the legacy UE.

By providing the elongated BI value for the MTC device, it is possible to maintain the compatibility with the legacy UE. When the extended BI sub-header is received, the legacy UE uses only the legacy BI value. However, The MTC device uses the longer BI value using the $index_M$ at the reserved bit positions.

The $index_M$ value may be defined as shown in table 1. The D field 815 may be used as much as 2 bits so as to have a value in the range from 0 to 3 to indicate the $index_M$ value. The eNB may configure the mapping table between the D field 815 and $index_M$ value to notify the UE of their relationship. The mapping table between the D field 815 and $index_M$ value may use predetermined values without pre-configuration procedure.

TABLE 1

| D | $Index_M$ |
|---|---|
| 0 | 2 |
| 1 | 4 |
| 2 | 6 |
| 3 | 8 |

In the LTE standard, the RAR may include the BI value in the preamble retransmission procedure. That is, the UE which has failed finding its RAPID in the corresponding RAR performs backoff by applying the BI value included in the RAR. However, if the RAR includes a BI value dedicated to the MTC device, the preamble retransmission procedure may be applied without extra BI provision process.

Figure 9:
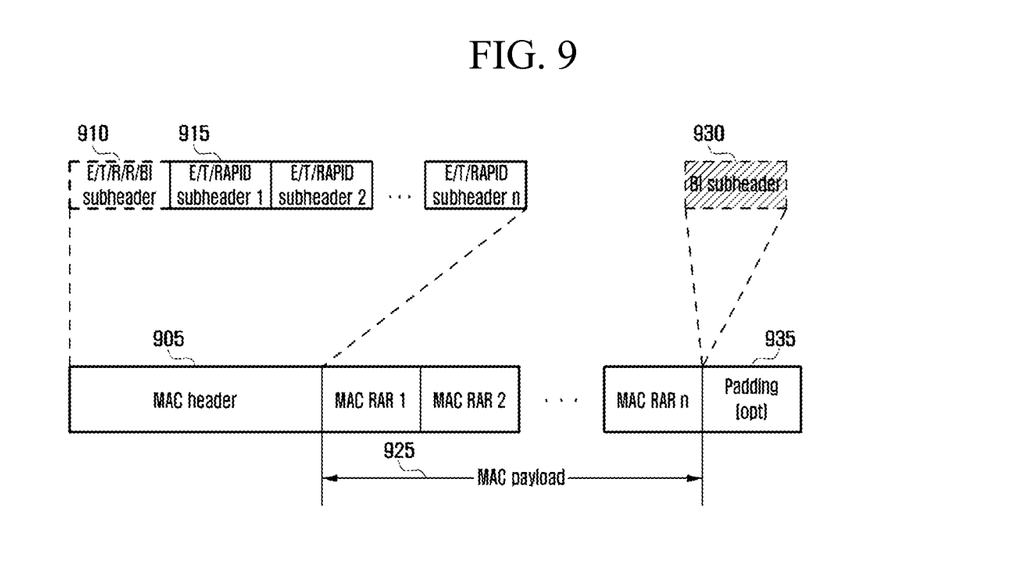
FIG. 9 is a diagram illustrating a structure of RAR according to the third embodiment of the present invention.

FIG. 9 is a diagram illustrating a structure of RAR according to the third embodiment of the present invention. In more detail, FIG. 9 shows the RAR structure configured in consideration of the compatibility with the legacy UE while providing the BI for the MTC device.

Referring to FIG. 9, the MAC sub-header 905 includes an E/T/R/R/BI sub-header 910 and at least one E/T/RAPID sub-header 915. The MAC payload 925 includes a plurality of MAC RAR fields. The BI 930 for the MTC device follows the MAC payload 925. Since the BI 930 follows the MAC payload 925, the UE is capable of using the extended RAR without extra operation. The padding field 935 is a field to fulfill the configured MAC field size and, if the current MAC field matches the configured size, the padding field 935 is not used. If the current MAC field is shorter or longer than the configured size, the padding field 935 may be configured to have garbage value or included in the MAC field.

Figure 10:
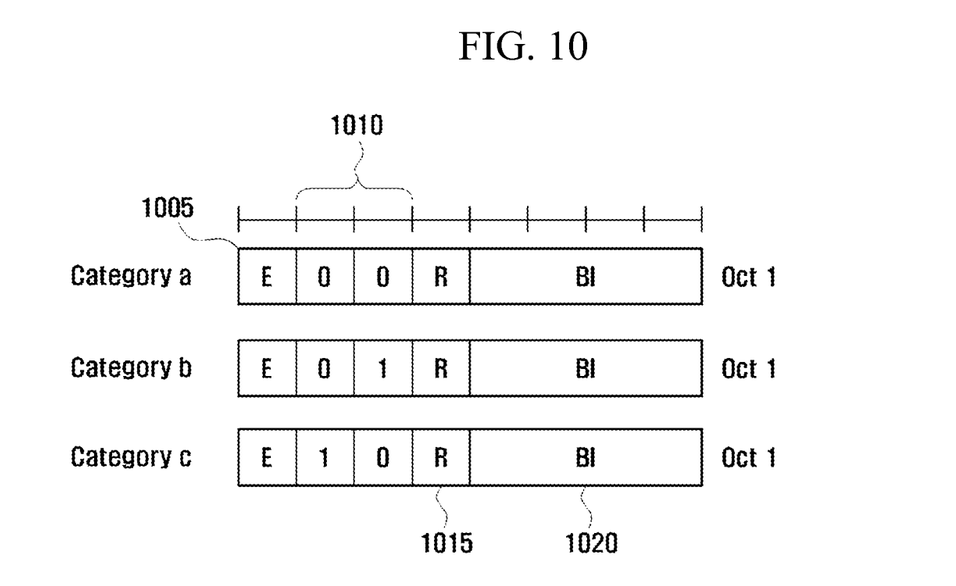
FIG. 10 is a diagram illustrating the BI structure for MTC device according to the third embodiment of the present invention.

FIG. 10 is a diagram illustrating the BI structure for MTC device according to the third embodiment of the present invention.

Referring to FIG. 10, the BI information is not applied to all of the UEs, and whether to change the EAB information may be determined according to the Public Land Mobile Network (PLMN) to which the corresponding UE is connected for receiving service. For this purpose, the EAB information change may be classified into one of plural categories. For example, three categories are assumed.

The first category (category a) is the case where all of the UEs use the BI information. The second category (category b) is the case where the UEs belonging to HPLMN and ePLMN are excluded among all of the UEs. Final category (category c) is the case where the UEs belonging to HPLMN and ePLMN and the roaming UEs are excluded among the all of the UEs.

If it is required to bar all of the MTC devices to reduce the radio access network load, the eNB bars the UEs belonging to the first category. If it is not required to bar the UEs belonging to the HPLMN and ePLMN in spite of the overload of the radio access network, the eNB bars the UEs belonging to the second category. If it is not required to bar still the roaming UEs, the eNB bars the UEs belonging to the final category. By performing the barring control per category, it is advantageous to bar the UEs according to the importance from the provider's view point. At this time, in order to perform per-category, the eNB has to notify the UE of the category to which the BI information is applied.

In FIG. 10, the E field 1005 indicates whether a sub-header or a MAC RAR follows at the next. The BI information indicator field 1010 following the E field 1005 is used to indicate the category. The BI information indicator field 1010 consists of 2 bits. In this case, 00 indicates category a, 01 indicates category b, and 10 indicates category c. Next, the R field 1015 consists of a reserved bit, and the BI field 1020 indicates the BI value.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A method of a terminal in a communication system, the method comprising:
   receiving, from a base station associated with a cell, a message including a first information element of categories for classifying at least one terminal according to a public land mobile network (PLMN) of the at least one terminal and a second information element of a backoff value respectively corresponding to each of the categories;
   identifying, in case that a PLMN for the terminal corresponds to one of the categories, a backoff time of a category corresponding to the PLMN for the terminal based on the second information element; and
   transmitting, to the base station, a preamble for an initial random access based on the identified backoff time,
   wherein the categories comprises a first category including all the terminals, a second category including one or more terminals except for at least one terminal corresponding to at least one home PLMN (HPLMN) or an equivalent PLMN (ePLMN), and a third category including one or more terminals except for the at least one terminal corresponding to the at least one HPLMN, the ePLMN or a visited PLMN (VPLMN), and
   wherein the identifying further comprises:
      identifying whether the first information element indicates the category corresponding to the PLMN for the terminal;
      determining to apply the backoff time indicated by the second information element, in case that the first information element indicates the category corresponding to the PLMN for the terminal; and determining to ignore the backoff time indicated by the second information element, in case that the first information element does not indicate the category corresponding to the PLMN for the terminal.

2. The method of claim 1, wherein the message is received on a higher layer signal.

3. The method of claim 1, further comprising:
retrying, in case that a random access response corresponding to the preamble not being received, transmission of the preamble after the identified backoff time.

4. The method of claim 1, further comprising:
identifying whether a delay tolerant access is required,
wherein the transmitting the preamble comprises
transmitting, in case that the delay tolerant access being required and the identified backoff time expiring, a preamble transmission time for the initial random access.

5. A terminal in a communication system, the terminal comprising:
a transceiver; and
at least one processor coupled with the transceiver and configured to:
receive, from a base station associated with a cell, a message including a first information element of categories for classifying at least one terminal according to a public land mobile network (PLMN) and a second information element of a backoff value respectively corresponding to each of the categories,
identify, in case that a PLMN for the terminal corresponds to one of the categories, a backoff time of a category corresponding to the PLMN for the terminal based on the second information element, and
transmit, to the base station, a preamble for an initial random access based on the identified backoff time,
wherein the categories comprises a first category including all the terminals, a second category including one or more terminals except for at least one terminal corresponding to at least one home PLMN (HPLMN) or an equivalent PLMN (ePLMN), and a third category including one or more terminals except for the at least one terminal corresponding to the at least one HPLMN, the ePLMN or a visited PLMN (VPLMN), and
wherein the at least one processor is further configured to:
identify whether the first information element indicates the category corresponding to the PLMN for the terminal;
determine to apply the backoff time indicated by the second information element, in case that the first information element indicates the category corresponding to the PLMN for the terminal; and
determine to ignore the backoff time indicated by the second information element, in case that the first information element does not indicate the category corresponding to the PLMN for the terminal.

6. The terminal of claim 5, wherein the message is received on a higher layer signal.

7. The terminal of claim 5, wherein the at least one processor is further configured to retry, in case that a random access response corresponding to the preamble not being received, transmission of the preamble after the identified backoff time.

8. The terminal of claim 5, wherein the at least one processor is further configured to:
identify whether a delay tolerant access is required, and
transmit, in case that the delay tolerant access being required and the identified backoff time expiring, a preamble transmission time for the initial random access.

9. A method of a base station in a communication system, the method comprising:
generating a message including a first information element of categories for classifying at least one terminal according to a public land mobile network (PLMN) of the at least one terminal and a second information element of a backoff value respectively corresponding to each of the categories;
transmitting, to a terminal, the generated message; and
receiving, from the terminal, a preamble for an initial random access based on a backoff time,
wherein, in case that a PLMN for the terminal corresponds to one of the categories, the backoff time of a category corresponding to the PLMN for the terminal is identified based on the second information element,
wherein the categories comprises a first category including all the terminals, a second category including one or more terminals except for at least one terminal corresponding to at least one home PLMN (HPLMN) or an equivalent PLMN (ePLMN), and a third category including one or more terminals except for the at least one terminal corresponding to the at least one HPLMN, the ePLMN or a visited PLMN (VPLMN), and
wherein whether the first information element indicates the category corresponding to the PLMN for the terminal is identified by the terminal, to apply the backoff time indicated by the second information element is determined by the terminal, in case that the first information element indicates the category corresponding to the PLMN for the terminal, and to ignore the backoff time indicated by the second information element is determined by the terminal, in case that the first information element does not indicate the category corresponding to the PLMN for the terminal.

10. The method of claim 9, wherein the generated message is transmitted on a higher layer signal.

11. A base station in a communication system, the base station comprising:
a transceiver; and
at least one processor coupled with the transceiver and configured to:
generate a message including a first information element of categories for classifying at least one terminal according to a public land mobile network (PLMN) of the at least one terminal and a second information element of a backoff value respectively corresponding to each of the categories,
transmit, to a terminal, the generated message, and
receive, from the terminal, a preamble for an initial random access based on a backoff time,
wherein, in case that a PLMN for the terminal corresponds to one of the categories, the backoff time of a category corresponding to the PLMN for the terminal is identified based on the second information element,
wherein the categories comprises a first category including all the terminals, a second category including one or more terminals except for at least one terminal corresponding to at least one home PLMN (HPLMN) or an equivalent PLMN (ePLMN), and a third category including one or more terminals except for the at least one terminal corresponding to the at least one HPLMN, the ePLMN or a visited PLMN (VPLMN), and wherein whether the first information element indicates the category corresponding to the PLMN for the terminal is identified by the terminal, to apply the backoff time indicated by the second information element is determined by the terminal, in case that the first information element indicates the category corresponding to the PLMN for the terminal, and to ignore the backoff time indicated by the second information element is determined by the terminal, in case that the first information element does not indicate the category corresponding to the PLMN for the terminal.

12. The base station of claim 11, wherein the generated message is transmitted on a higher layer signal.

\* \* \* \* \*